United States Patent [19]
Moretz, Jr.

[11] Patent Number: 5,395,041
[45] Date of Patent: Mar. 7, 1995

[54] ENGINE COOLANT FILL-VALVE WITH BYPASS

[75] Inventor: Ralph D. Moretz, Jr., Jackson, Mich.

[73] Assignee: Mid-American Products, Inc., Jackson, Mich.

[21] Appl. No.: 175,454

[22] Filed: Dec. 30, 1993

[51] Int. Cl.⁶ .................................................. F01P 7/14
[52] U.S. Cl. ..................................... 236/345; 285/924
[58] Field of Search ................. 236/34, 34.5; 285/924

[56] References Cited

U.S. PATENT DOCUMENTS

| | | | |
|---|---|---|---|
| 4,022,377 | 5/1977 | Wagner et al. | 236/34.5 |
| 4,052,965 | 10/1977 | Morris | 236/34.5 X |
| 4,193,542 | 3/1980 | Knauss | 236/34.5 |
| 4,347,973 | 9/1982 | Jackson | 236/34.5 |
| 4,379,574 | 4/1983 | Leichtl | 285/211 |
| 4,643,134 | 2/1987 | Schizlein | 236/34.5 X |
| 4,944,536 | 7/1990 | Bartholomew | 285/319 |
| 4,960,153 | 10/1990 | Bergsma | 137/587 |
| 5,135,264 | 8/1992 | Elliott-Moore | 285/924 X |

*Primary Examiner*—William E. Tapoical
*Attorney, Agent, or Firm*—Beaman & Beaman

[57] ABSTRACT

An internal combustion engine fitting containing a thermostatically controlled valve regulating the flow therethrough is formed by two parts interconnectable by relative rotation through a bayonet type connection. The bayonet connection utilizes two stages wherein the first stage maintains the parts connected but a bypass passage defined between the parts permits the flow of coolant through the fitting around the valve to initially permit the engine coolant system to be filled. After the coolant system is filled, the fitting parts are rotated to a final closed position sealing the bypass passage permitting the thermostatic valve to control flow through the fitting during normal engine operation. The fitting parts remain sealed to the atmosphere during both stages of interconnection.

8 Claims, 2 Drawing Sheets

ENGINE COOLANT FILL-VALVE WITH BYPASS

BACKGROUND OF THE INVENTION

1. Field of the Invention

The invention pertains to thermostatically controlled fittings for internal combustion engine coolant systems which includes a closable bypass passage which permits coolant flow therethrough during filling of the engine coolant system to eliminate trapped air pockets.

2. Description of the Related Art

Internal combustion engines utilize thermostatically controlled valves to regulate the coolant temperature for various purposes. Such thermostatic valves are closed when the engine is cold to prevent coolant circulation and accelerate the heating of the engine block to improve engine operating characteristics, and accelerate the heating of the vehicle occupant climate control system. Upon the engine coolant reaching a predetermined elevated temperature, the thermostatic valve begins to open permitting the coolant to circulate through a cooling radiator to achieve the desired coolant temperature during normal engine operation.

Such thermostatic valves may be incorporated into various parts of the engine coolant system. Usually, thermostatic valves are incorporated into hose lines or hose fittings for ease of assembly and replacement.

When an internal combustion engine is initially assembled, it is, of course, cold and the thermostatic valves in the coolant system will be closed. As the coolant is introduced into the coolant system, the closed thermostatic valve will cause air to be trapped within the coolant system preventing the coolant system from being fully charged with coolant, and it is often necessary to use expensive "bleeding" procedures to permit entrapped air to escape from the coolant system during the initial engine coolant charging. Due to the complexity of modern internal combustion engines, the confinement and clearance problems existing in the engine compartment, especially in front wheel drive vehicles, the loosening of components within the coolant system to permit the bleeding of entrapped air is difficult and time consuming, and once the bleeding has been completed, it is possible for the mechanic to overlook the need to fully restore the coolant system to its liquid tight condition resulting in liquid loss during engine operation.

OBJECTS OF THE INVENTION

It is an object of the invention to provide a fitting for internal combustion engine coolant systems which permits a cold engine to be fully charged with coolant regardless of the fact that the thermostatic valve within the fitting may be closed, and wherein the coolant system maintains its sealed integrity and coolant loss to the atmosphere is prevented.

Another object of the invention is to provide a fitting for the coolant system of internal combustion engines containing thermostatically controlled normally closed valves wherein the fitting consists of two parts which may be readily manipulated between coolant bleeding and normal operating positions and the fluid-tight integrity of the coolant system is maintained at all times.

Yet another object of the invention is to provide a fitting for an internal combustion engine coolant system having a normally closed thermostatic valve wherein the fitting parts may be economically manufactured, readily assembled, and the parts relatively movable between coolant bleeding and operative positions by an unskilled operator, and wherein the condition of the fitting may be readily observed.

SUMMARY OF THE INVENTION

The invention takes the form of a fitting to be located within an internal combustion engine coolant system. In the disclosed embodiment, the fitting is incorporated into the coolant hose system, but it is to be appreciated that the concepts of the invention may be incorporated into a coolant fitting partially formed by the engine block or associated component. In the practice of the invention, it is necessary that the coolant fitting consist of at least two parts, and one of the parts being relatively movable to the other requiring that the movable part be associated with a flexible hose incorporated into the cooling system.

The two parts constituting the fitting each include a coolant flow passage therethrough, and a conventional thermostatic normally controlled valve will be incorporated into one of the parts capable of associating with a valve seat whereby the valve controls fluid flow through the fitting assembled parts. In its normal "cold" condition, the valve will be closed preventing coolant flow between the fitting parts.

The fitting parts are interconnected by connection structure preferably of the bayonet type including tongues fitting within slots. In actuality, a plurality of slots and tongues are concentrically positioned with respect to an axis of relative rotation between the parts whereby relative part rotation causes a tongue to enter and cooperate with an associated slot to maintain the parts in assembled relationship.

The slots and tongues are configured such that their interrelationship is in two stages. The slots each include a pair of restraining surfaces for cooperation with the tongues which are axially spaced relative to each other wherein engagement between the tongues and the first restraining surface produces a first axial relationship between the parts, while further rotation of the parts causes the tongues to engage the second restraining surfaces within the slots further axially displacing the parts toward each other to a final fully connected condition.

An annular resilient flexible seal is interposed between the fitting parts at the connection structure adapted to be compressed upon the parts being fully connected, and the seal is received between opposed parts' surfaces to maintain a sealed relationship between the interior of the fitting parts and the atmosphere at both stages of interconnection between the parts thereby rendering the fitting fluid tight to the atmosphere regardless of the condition of the parts' interconnection between the two stages.

During the initial stage of parts' interconnection, the elastomeric seal does not seal the parts' flow passages relative to each other, as the plate in which the valve head is mounted not engaging its seal and the separation of the parts within the parts' flow passages permits a bypass passage to be defined around the valve permitting one part to communicate with the flow passage of the other part wherein air and coolant may flow from one fitting part to the other around the thermostatic valve. This condition of the fitting parts prevents air from being trapped on one side or the other of the valve providing a "bleed" condition to prevent air from being trapped within the coolant system and permitting the engine cooling system to be fully filled or charged with coolant.

After the engine coolant system has been fully filled, the two parts of the valve fitting may be relatively rotated causing the tongues to engage the second set of restraining slot surfaces drawing the parts closer together causing the plate in which the valve head is mounted to engage the elastomeric seal between the parts to close off the valve bypass passage and permitting coolant flow through the fitting only in accord with the position of the thermostatic valve.

While the relative angular rotation between the fitting parts between the two stages of interconnection is not great, the angular relationship between the fitting parts may be readily observed by the operator, and the condition of the fitting visually noted. If desired, index marks may be mounted on the fitting parts of a raised or recessed type to indicate the relative condition between the fitting parts, and if desired, indicia may be employed indicating "closed" and "bypass" positions. Rotation of the fitting parts relative to each other may be readily manually accomplished by an operator, even in cramped quarters, and requires minimal technical skills.

As a coolant fitting in accord with the invention prevents the escape of coolant to the atmosphere during the filling of the engine coolant system, environmental concerns are met, loss of expensive coolant is prevented and a highly desirable coolant filling process is achieved for internal combustion engines.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 2:
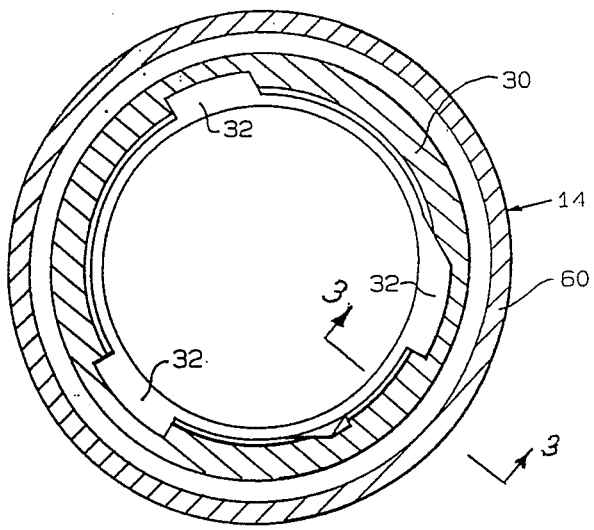
FIG. 2 is a plan sectional view taken along Section 2—2 of FIG. 1.
Figure 1:
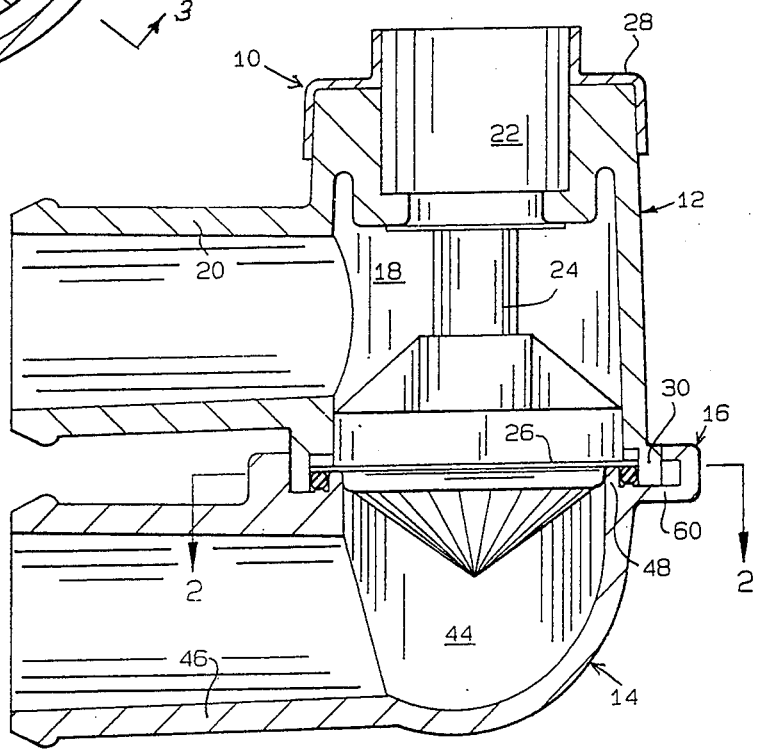
FIG. 1 is a diametrical sectional view of an internal engine coolant fitting utilizing the concepts of the invention, the fitting parts being shown in the fully closed condition.

With reference to FIG. 1, a fitting for an internal engine cooling system is generally indicated at 10, and the fitting basically consists of a first part 12 connected to a second part 14 through connection structure generally indicated at 16. The fitting 10 may be formed of metal or a synthetic plastic material, and is incorporated into the hose system of the coolant circuit of an internal combustion engine, not shown.

The part 12 is hollow and includes an internal flow passage 18 communicating with the tubular nipple 20 upon which a hose, not shown, constituting a part of the coolant system circuit is mounted and clamped.

A thermostatic valve 22 is located within the flow passage 18 and the valve includes a valve stem 24 terminating in a valve head located within a plate 26. The valve 22 senses the temperature of the engine coolant, and the entire fitting 10 may be connected to the engine block through a valve cap 28 whereby the valve 22 is directly exposed to the temperature of the engine block. In its normal condition, the valve 22 will be expanded which extends the valve head within plate 26 downwardly as shown in FIG. 1, and as the temperature of the coolant increases, the valve head within plate 26 will rise. As is well known, thermostatic valves 22 are pre-set to open and close at predetermined temperatures depending on the engine coolant system design.

The part 12 includes an annular lower flange 30 having a plurality of radially extending tongues 32 defined thereon, three tongues being shown in the illustrated embodiment. Each of the tongues 32 includes a forward portion 34 transversely disposed to the axis of the connection structure 16, and concentric to such axis. The tongues also include a transitional or inclined cam portion 36 which extends from portion 34 and blends with rear portion 38. As will be appreciated from the drawings, the portions 34 and 38 are axially offset with respect to each other, and the forward portion 34 constitutes the primary connection to the part 14.

The fitting part 14 includes a flow passage 44 communicating with the tubular nipple 46 adapted to receive a hose and clamp, not shown, constituting a part of the engine coolant system. The part 14 includes an annular valve seat extension 48 adjacent the connection structure 16 and the upper end of the extension 48 constitutes a valve plate stop at 50. The lower flange 30 of part 12 is radially spaced outwardly with respect to the valve seat extension 48 defining an annular chamber 54 between the extension 48 and flange 30. The annular chamber 54 includes a ridge 56 formed in the part 14 and an annular resilient flexible O-ring type seal 58 is received within the chamber 54. The diameter of the cross section of the seal 58 is slightly greater than the radial dimension of the chamber 54 whereby the seal provides a fluid tight sealing between the extension 48 and flange 30 preventing the loss of coolant to the atmosphere at either connection stage of the parts 12 and 14 as later described.

A plurality of slots 59 are formed upon the part 14 within the annular boss 60 constituting a portion of the connection structure 16 and as three tongues 32 are defined on the part 12, three similar slots 59 are formed upon the part 14 of such a dimension and configuration as to receive the tongues 32. Each slot 59 includes an initial connection retainer surface 62, a transition cam surface portion 64 and a final connection retainer surface 66.

Figure 5:
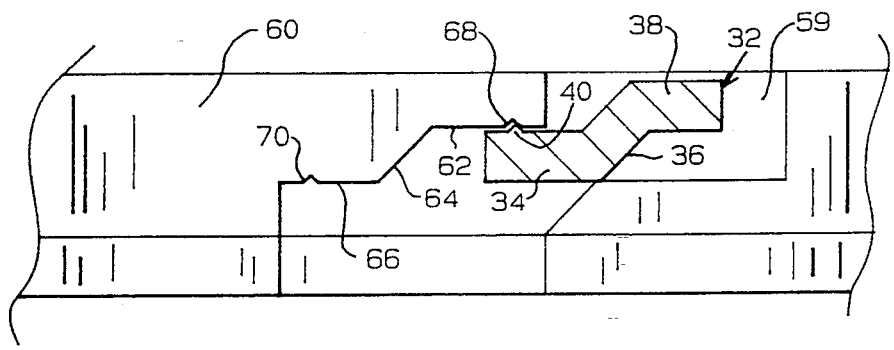
FIG. 5 is an elevational detail view of the fitting parts bayonet slots and tongue illustrating the relationship of the components during the partially connected engine coolant charging condition.
Figure 6:
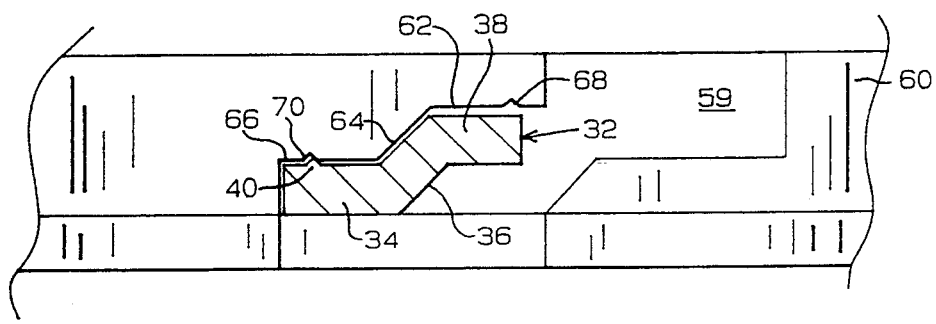
FIG. 6 is an enlarged detail elevational view similar to FIG. 5 illustrating the fitting parts in the fully connected position.

A detent recess or groove 68 is defined in the surface 62, while a detent recess 70 is defined in the retainer surface 66 and upon the upper surface of the tongue forward portion 34, as shown in FIGS. 5 and 6, a detent projection 40 extends capable of being selectively received within recesses 68 and 70.

Figure 7:
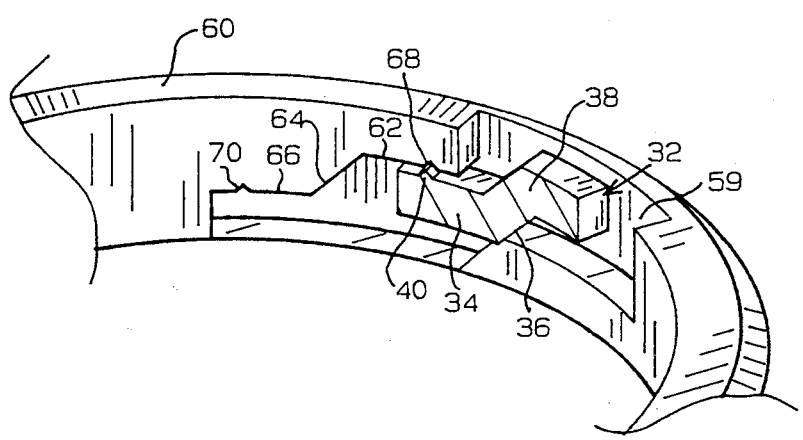
FIG. 7 is a perspective view of the components shown in FIG. 5 during partial parts interconnection.

A plurality of ribs 72 are formed in the flange 30 at the connection structure 16 and these vents are circumferentially spaced about the interior of the flange to define a plurality of passages 74 therebetween. The passages 74 as defined by the radial dimension of the ribs 72 is greater than the diameter of the plate 26 in which valve head is located whereby fluid may flow around the periphery of the plate 26 between the ribs 72 when the parts 12 and 14 are partially or preliminarily interconnected, In the use of the fitting 10, the appropriate coolant system hoses, not shown, will be mounted upon the fitting nipples 20 and 46, and the parts 12 and 14 will be preliminarily assembled wherein the tongues 32 will be received within the slots 59 and the tongues' forward portions 34 will be disposed "under" the slots' retainer surfaces 62. The detent 40 will be received within the detent recesses 68 as shown in FIGS. 5 and 7.

Figure 3:
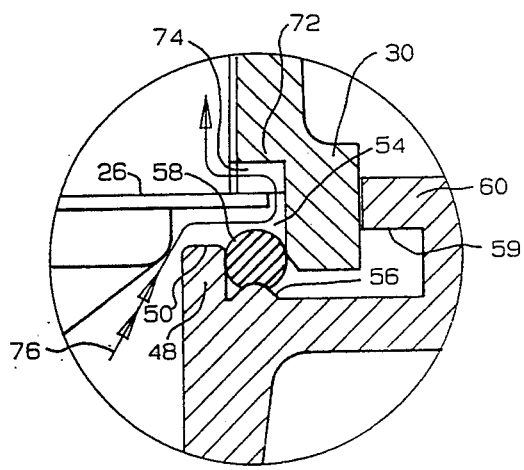
FIG. 3 is an enlarged sectional view of the interconnection between the fitting parts as taken along Section 3—3 of FIG. 2, illustrating the parts in the initial coolant charging position when the bypass flow passage is open.

In this relationship of the components, the extension 48 and flange 30 will be in radial opposed relationship as shown in FIG. 3, and the seal 58 will prevent coolant within the fitting 10 from escaping to the atmosphere. However, due to the axial separation of the surfaces 62 and 66 with respect to the axis of rotation of the connection structure 16 the plate 26 will not be engaging the seal 58, and coolant may flow from the flow passage 44 of part 14 to the flow passage 18 of the part 12 around the periphery of the plate 26 between the ribs 72 as shown by the arrows 76, FIG. 3. This bypassing of the plate 26 through the passages 74 permits any air that may be trapped within the part 14 to escape from below the plate 26 into the part 12 and through the connected hose and, of course, such air will flow to the upper portion of the coolant system and escape to the atmosphere. Accordingly, the components of the fitting 12 will be maintained in the partially connected condition shown in FIGS. 3, 5 and 7 during filling of the engine coolant system thereby preventing thermostatic valves within the system from entrapping air.

Figure 4:
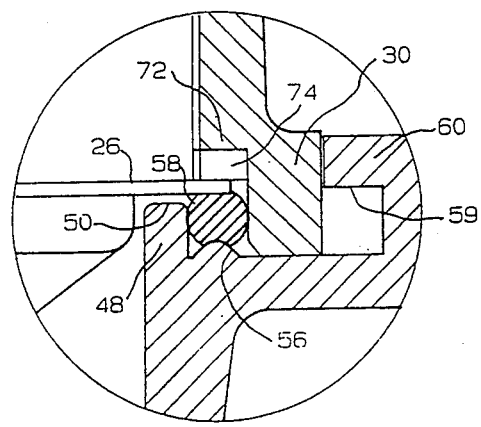
FIG. 4 is an enlarged detail sectional view similar to FIG. 3 illustrating the relationship of the fitting parts when fully assembled.
Figure 8:
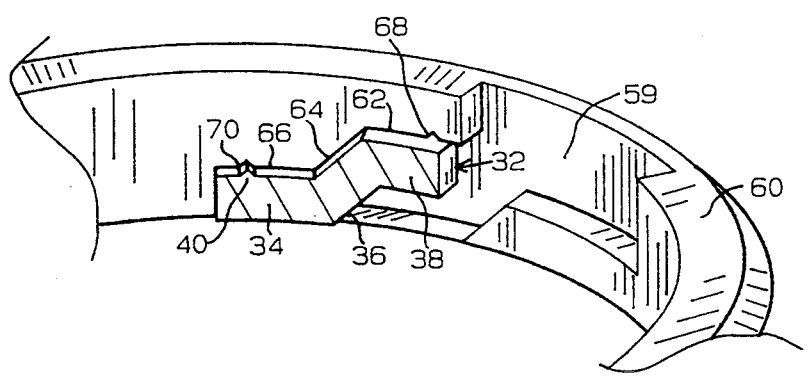
FIG. 8 is a perspective view of the components shown in FIG. 6 during full connection.

After the engine coolant system has been completely charged, the mechanic will then rotate the parts 12 and 14 relative to each other causing the tongues 32 to engage the slot cam surface 64 and position the tongues' forward portions 34 against the slots' retaining surfaces 66 as shown in FIGS. 6 and 8. In this condition, the detent 40 will be received within the detent recess 70. This relative rotation of the parts 12 and 14 about the axis of the connection structure 16 will force the parts 12 and 14 toward each other and the plate 26 in which the valve head is mounted will engage the seal 58 as shown in FIG. 4. When the valve plate 26 engages the seal 58 the passages 74 become sealed, and fluid flow between the parts 12 and 14 is prevented by the plate 26 and seal 58, and when the coolant heats to the desired temperature and the valve head opens and lifts within the plate 26 during the normal temperature controlling operation of the valve 22 and the coolant will flow through passages 74.

The engagement of the detent 40 with the recess 70 prevents inadvertent disassembly of the parts 12 and 14 due to vibration, and the components will remain in this locked condition during the normal engine operation. If the coolant system is drained, and it is desired to permit bleeding through the fitting 10, the parts 12 and 14 may be rotated to the position shown in FIGS. 5 and 7, and the coolant system again charged as described above.

The angular relationship between the parts 12 and 14 may be readily observed by the mechanic, and accordingly, the condition of the fitting 10 is readily observable. As the seal 58 prevents coolant leakage from the fitting during both the preliminary and final connection of the fitting parts, loss of coolant is prevented, and a coolant fitting constructed in accord with the invention overcomes many of the problems previously encountered with respect to engine coolant charging.

To aid in determining the angular relationship between the parts 12 and 14, indicia or index marks may be formed upon the parts so as to be relatively comparable. Such index marks may be raised or recessed, molded or cast into the parts, and may include terminology such as "closed" or "bypass". Also, it is to be understood that the nipples 20 and 46 may take various forms, and could include automatic self-connecting fittings whereby the hose may be readily plugged onto the parts 12 and 14 without requiring hose clamps.

It is appreciated that various modifications to the inventive concepts may be apparent to those skilled in the art without departing from the spirit and scope of the invention. For instance, rather than the valve bypass passage being defined by the partial open condition of the thermostatic valve during the initial interconnection of the parts, as described, a separate bypass passage could be defined in one or both of the parts which is open during the first stage of parts' interconnection and closed during the final connection of the parts, and such a variation is within the scope of the invention.

I claim:

1. An engine coolant valved fitting comprising, in combination, a first part having a first flow passage defined therein, a second part having a second flow passage defined therein, annular connection structure defined on said parts having an axis including first elements formed on said first part engageable with second elements formed on said second part whereby relative rotation of said first and second elements about said axis interconnects said first and second parts, a valve located in said first flow passage part adjacent said connection structure controlling flow through said first flow passage, said valve controlling flow between said first and second flow passages upon said first and second parts being fully interconnected, said first and second elements being selectively engageable between partially connected and fully connected positions as determined by the extent of relative rotation between said first and second elements, and a valve bypass passage defined between said first and second flow passages open at said partially connected position of said elements bypassing said valve and establishing communication between said first and second flow passages and closed upon said elements being in said fully connected position during normal operation of the fitting.

2. In an engine coolant valved fitting as in claim 1, said first and second elements comprising a bayonet type connection.

3. In an engine coolant valved fitting as in claim 2, said first elements comprising annular slots each having first and second axially spaced retaining surfaces interconnected by an inclined cam surface and said second element comprising annular tongues received within said slots selectively engageable with said retaining surfaces and said cam surface.

4. In an engine coolant valved fitting as in claim 3, mating detent means defined on said retaining surfaces and tongues interengaging at said partially connected and fully connected positions.

5. In an engine coolant valved fitting as in claim 1, an annular resilient seal interposed between said first and second parts adjacent said connection structure, said seal sealing said first and second parts relative to each other and closing said bypass passage at said elements' fully connected position and unsealing said first and second parts relative to each other and opening said bypass passage at said elements' partially connected position, said seal sealing said connection structure relative to the atmosphere at both the partial and fully connected positions of said elements.

6. An engine coolant valved fitting comprising, in combination, a first part having a first flow passage defined therein, a second part having a second flow passage defined therein, annular connection structure defined on said parts having an axis including first elements formed on said first part engageable with second elements formed on said second part whereby relative rotation of said first and second elements about said axis interconnects said first and second parts, a valve located in said first flow passage part adjacent said connection structure controlling flow through said first flow passage, said valve controlling flow between said first and second flow passages upon said first and second parts being fully interconnected, said first elements comprising annular slots defined in said second part concentric to said axis each having first and second axially spaced retaining surfaces interconnected by an inclined cam surface, said second elements comprising radial tongues defined on said first part each received within a slot and selectively engageable with said retaining surfaces as determined by the relative rotational position of said parts about said axis, engagement of said tongues with said slots' first retaining surfaces producing a partially connected position between said parts and engagement of said tongues with said slots' second retaining surfaces producing a fully connected position between said parts, and a valve bypass passage defined between said first and second flow passages open at said partially connected parts' position establishing communication between said parts' flow passages and closed at said fully connected position during normal operation of the fitting.

7. In an engine coolant valved fitting as in claim 6, mating detent means defined on said retaining surfaces and tongues interengaging at said partially connected and fully connected positions.

8. In an engine coolant valved fitting as in claim 6, an annular resilient seal interposed between said first and second parts adjacent said connection structure, said seal sealing said first and second parts relative to each other and closing said bypass passage at said elements' fully connected position and unsealing said first and second parts relative to each other and opening said bypass passage at said elements' partially connected position, said seal sealing said connection structure relative to the atmosphere at both the partial and fully connected positions of said elements.

* * * * *